United States Patent

[11] 3,578,176

[72] Inventor Kenneth W. Cuyler
    Deerfield, Ill.
[21] Appl. No. 823,098
[22] Filed May 8, 1969
[45] Patented May 11, 1971
[73] Assignee William W. Nugent & Company, Inc.
    Skokie, Ill.

[54] FILTER DISC
    4 Claims, 4 Drawing Figs.
[52] U.S. Cl. ..................................................... 210/492
[51] Int. Cl. ..................................................... B01d 29/34
[50] Field of Search ........................................... 210/488, 492

[56] References Cited
    UNITED STATES PATENTS
2,604,994  7/1952  Vocelka ........................ 210/492
2,687,805  8/1954  Proulx .......................... 210/492
3,481,472  12/1969 Petri ........................... 210/492X Primary Examiner—John Adee
Attorney—Anderson, Luedeka, Fitch, Even & Tabin ABSTRACT: For use in a stack of axially aligned and axially compressed discs of filtering material having circumferentially spaced and alternating inlet and outlet openings communicating through inlet and outlet passageways respectively with the outer peripheries and central apertures of the discs, a disc in which the inlet and outlet openings are shaped and sized to avoid collapse of adjacent discs into the outlet openings and the outlet passageways and to provide a large sealing pressure at the overlapping surfaces of adjacent discs to prevent liquid being filtered from passing between the discs of filter material.

Patented May 11, 1971
3,578,176
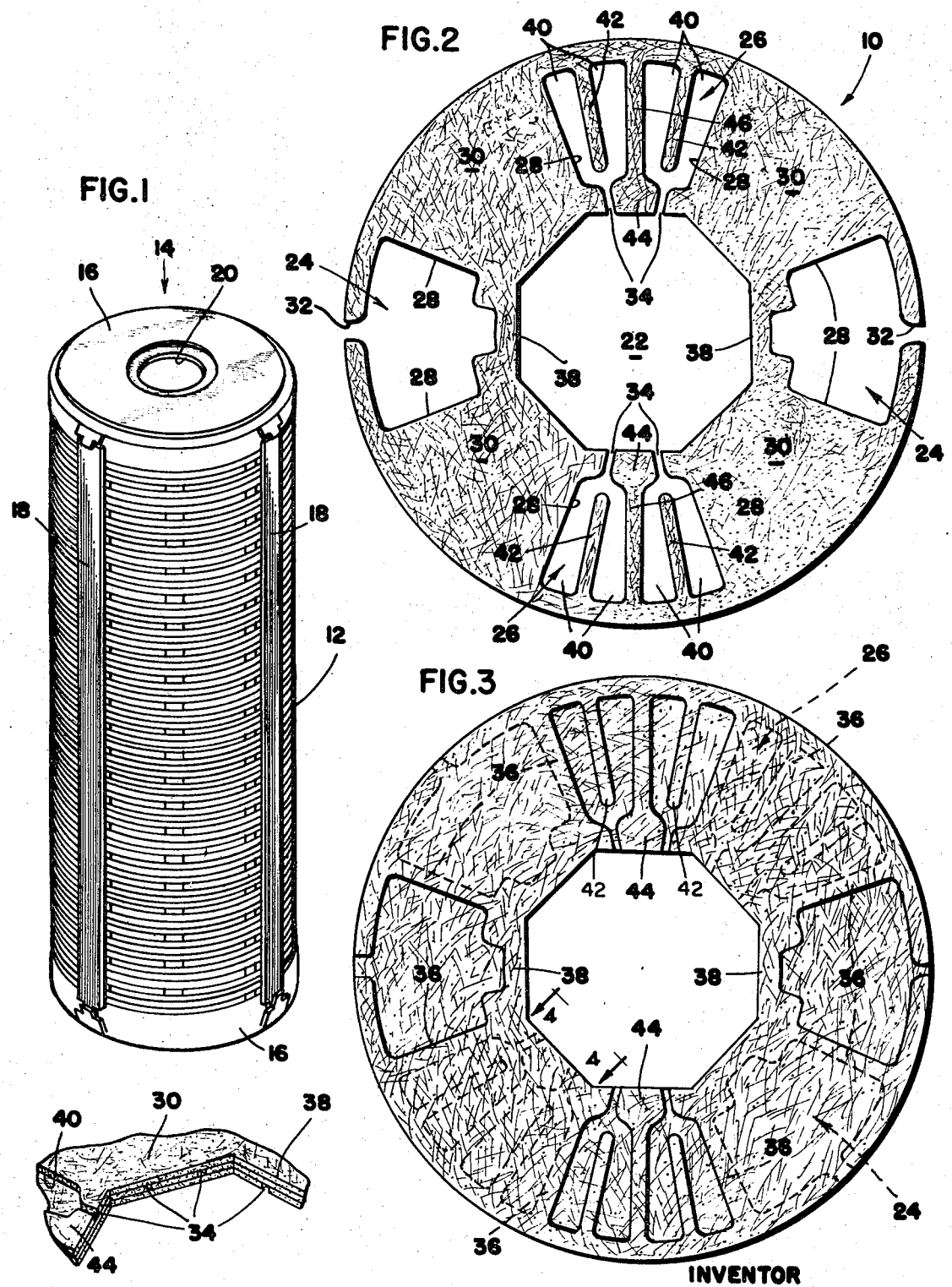
INVENTOR
KENNETH W. CUYLER
Anderson, Luedeka, Fitch, Even, &Tabin
ATTYS.

FILTER DISC

The present invention relates generally to filter cartridges formed from a plurality of filter discs of the same configuration arranged in a stack. The invention relates more particularly to the specific configuration of each disc.

One form of filter cartridge (sometimes referred to as a "recharge" which is used extensively in the filtering of liquids such as oil consists of a plurality of circular discs formed of a fibrous material such as wood pulp, paper, felt or the like and arranged one atop the other to form a stack. An example of such discs and a cartridge formed therefrom is found in U.S. Pat. No. 2,604,994 which issued July 29, 1952. Generally each disc includes a central outlet aperture and a plurality of pairs of cutout openings of substantially equal circumferential extent angularly spaced equal distances around the disc. Alternate ones of these openings are inlet openings communicating with the outer periphery of the disc through inlet passageways. The intervening openings are outlet openings which communicate with the central outlet aperture through outlet passageways. Intervening between the openings are imperforate filter sections.

Within the cartridge, the filter discs are arranged to form a stack in which each successive disc is rotationally displaced 45° out of vertical alignment with the immediately overlying disc so that each inlet opening is in vertical alignment with a filtering area of an adjacent overlying disc and that filtering area is in turn vertically aligned with an outlet opening of the next disc. Thus, throughout the stack, inlet chambers defined by inlet openings are separated vertically from outlet chambers defined by outlet openings and the filtering areas which, ideally, provide the only path of communication between the chambers.

During use, the filter cartridge is placed in a vessel or housing in communication with a conduit carrying the fluid to be filtered, and the fluid is pumped under pressure into and out of the vessel. The fluid enters each inlet opening through an inlet passageway, then flows axially through the imperforate filtering area of adjacent discs and into outlet openings of the next discs, and finally flows into the central apertures through the outlet passageways. While this is the desired path of fluid flow, the fluid occasionally tends to separate adjacent discs and bypass the filtering areas. Also, by applying axial pressure on the filtering areas, the fluid eventually tends to cause such areas to collapse axially into the outlet openings and the outlet passageways of adjacent discs again permitting fluid to reach the central outlet aperture without passing through the filtering material.

It is a principal object of the invention to provide an improved configuration of filter disc to insure fluid flow only in the desired path through the filtering areas.

Other objects and advantages of the invention will become apparent with reference to the following description and the accompanying drawing.

In the drawing:

FIG. 1 is a perspective view of a filter cartridge having discs embodying various features of the present invention;

FIG. 2 is an enlarged plan view of the improved disc;

FIG. 3 is a view similar to that of FIG. 2, but showing in dotted outline the cutouts of the immediately underlying disc; and FIG. 4 is an enlarged fragmentary elevational view as seen in the direction of the arrows 4—4 of FIG. 3.

The invention is shown in the drawings for purposes of illustration embodied in a plurality of discs 10 which are adapted for arrangement in axial alignment in a stack 12 in a cartridge 14. The cartridge, in addition to the stack of discs, includes end plates or bezels 16 and straps or bands 18 which extend between and are attached at their opposite ends to the end plates to maintain the cartridge parts assembled with the stack of discs in axial compression between the end plates.

The cartridge 14 is adapted to be used in conjunction with a filter vessel (not shown) similar to that shown in U.S. Pat. No. 2,604,994. Although this vessel will not be described in detail herein, it may be assumed that it includes an inlet which communicates with the external or outer cylindrical surface of the cartridge and an outlet which communicates with the interior or central opening of the cartridge through central apertures 20 in the end plates. It may also be assumed that the stack 12 is compressed within a suitable press and that it is bound by the end plates 16 and straps 18 while in the compressed state.

Each of the discs 10 has a circular outer periphery, a central aperture 22 and a plurality of pairs of cutout openings 24 and 26. These openings are of substantially equal circumferential extent and they are angularly spaced equal distances around the disc. Each has radially disposed, straight side edges 28 spaced circumferentially from the adjacent side edges of adjacent openings by imperforate sections 30 of greater circumferential extent that the openings. Alternate ones 24 of the openings are inlet openings which communicate with the exterior of the disc through inlet passageways 32 opening radially through the outer periphery of the disc. The intervening openings 26 are outlet openings which communicate with the central aperture 22 of the disc through outlet passageways 34 opening radially and inwardly through the inner periphery of the disc.

Preferably, as in this instance, there are two inlet openings 24 and two outlet openings 26 on each disc 10 and each opening is disposed on an eighth section of the disc. The intervening imperforate sections 30 then are located on the intervening eighth sections. With this arrangement, each disc in the stack is turned through 45° with respect to the next adjacent discs about their common axis so that, as viewed in FIG. 3, each of the openings of each disc registers with imperforate areas of both of the adjacent overlying and underlying discs in the stack. To facilitate this relative arrangement between the discs, the central opening 22 is in the form of an octagon and the discs are normally assembled on a stick (not shown) of similar configuration. Also, each outlet opening in each disc registers with an inlet opening on each of the discs spaced two discs away in the stack. Thus, liquid under pressure on the exterior of the stack flows inwardly through the inlet passageways 32 of the various discs and into the inlet openings which cooperate with the adjacent imperforate sections of adjacent discs to define inlet chambers.

Along the side edges 28 of the inlet openings 24, an imperforate portion of each disc overlaps an imperforate portion of the adjacent discs as indicated at 36 in FIG. 3 and the overlapping area is subjected to the axial pressure on the stack to form a seal to prevent liquid from flowing along the overlapping area and in a plane normal to the common axis of the discs rather than axially through the imperforate sections 30 of the discs registering with the inlet openings and into the outlet openings 26 in registry with such imperforate sections. From the outlet openings, the liquid flows radially and inwardly to the central apertures 22 of the discs through the outlet passageways 34.

From the inlet openings 24, there also is a tendency for the liquid to flow radially and inwardly to the central apertures 22 and along the imperforate inner peripheral portions 38 of the discs between the central apertures and the inlet openings. This same liquid exerts a pressure tending to urge such inner peripheral portions axially and into the outlet passageways 34 of other discs in vertical registry with the inner peripheral portions.

In accordance with the present invention, each disc 10 is constructed in a novel manner to prevent axial collapse of imperforate parts of adjacent discs into outlet openings 26 and outlet passages 34 and to avoid lateral flow of liquid between overlapping portions 36 of adjacent discs adjacent the side edges 28 of the inlet openings. With respect to axial collapse of the outlet openings and passageways, this is accomplished by forming each outlet opening of each disc with two sections 40 of U-shape each with two radially extending narrow legs straddling a narrow strip 42 of the filtering material extending radially and cantilever fashion from the outer periphery of the disc. Each U-shaped cutout 40 section also is formed with a cross portion connecting the inner ends of the legs and communicating with the central aperture of the disc through a narrow outlet passageway aligned with the narrow cantilever strip 42 and separated from the outlet passageway for the other U-shaped section. By thus forming two separated narrow passageways, there is provided between then a circumferentially extending bridge 44 which engages and prevents axial collapse of the inner peripheries of adjacent discs.

In order to prevent the flow of liquid laterally between adjacent discs at their overlapping areas 36 at the radial edges 28 of the inlet openings 24, these edges are disposed closely adjacent the radial edges of the eighth section of each disc occupied by each inlet opening. This results in small areas of overlap and correspondingly high axial pressures per unit area, the total axial pressure exerted on the stack being distributed over the areas of overlap of the disc. Thus, with the same axial pressure exerted on the stack, a smaller area of overlap of adjacent discs adjacent the radial side edges of the inlet openings results in a greater axial pressure between the overlapping surfaces and a correspondingly greater resistance to lateral liquid flow between the surfaces.

In one disc 10 constructed as discussed above and filtering satisfactorily without lateral leakage across the overlapping surfaces adjacent the radial edges 28 of the inlet openings 24, the disc was 6⅜ inches in diameter and each such edge of each inlet opening was spaced a distance of one eighth of an inch from the radius at the adjacent edge of the eighth section of the disc from which the opening was cut. Thus, as compared to the 45° between the defining radii of the eighth section, the radial edges of each inlet opening are spaced apart angularly by approximately 36°.

It will be apparent that, in the improved discs 10, each of the outlet openings 26 occupies a large portion of its eighth section of the disc and, yet, collapse of the imperforate sections 30 of adjacent discs into the opening is effectively prevented not only by the dividing strip 46 between the two U-shaped sections 40 of the opening, but also, by the cantilever strip 42 of each section. Also, collapse of the adjacent discs into the outlet passageways of the section is prevented because these passageways are narrow as a result of the bridge 44. Further, due to the location of the radial edges 28 of the inlet openings 24 closely adjacent the edges of the eighth sections of these openings, leakage laterally across the overlapping surfaces 36 of adjacent discs adjacent these radial edges is effectively prevented.

Various of the features of the present invention are set forth in the following claims.

I claim:

1. For use in a filter cartridge which includes a plurality of thin flat circular discs of filtering material and means for maintaining the discs in axial alignment and under axial compression in a stack, a filter disc made of sheet filtering material and having a central aperture and a plurality of pairs of cutout openings of substantially equal circumferential extent angularly spaced equal distances around the disc and each having radially disposed side edges spaced circumferentially from the side edges of adjacent openings by imperforate sections of greater circumferential extent than the openings, alternate ones of said openings constituting inlet openings and having inlet passageways opening outwardly to the exterior periphery of the disc and the intervening openings constituting outlet openings and having outlet passageways opening inwardly into communication with said central aperture, each of said outlet openings having two sections each of generally U-shape with two radially extending narrow legs straddling a narrow strip of said material extending radially and in cantilever fashion from the outer peripheral portion of the disc and each with a cross portion connecting the inner ends of the legs and communicating with said central aperture through one of said outlet passageways.

2. The disc of claim 1, in which the circumferential extent of said imperforate sections exceeds such extent of said openings by a small amount, whereby the area of overlap of adjacent discs arranged in the stack with imperforate sections of each disc registering with openings of each adjacent disc is correspondingly small to provide a high sealing pressure between adjacent discs in such overlap area.

3. The disc of claim 1, in which said outlet passageways of each of said outlet openings are narrow to avoid axial collapse into said passageways of portions of adjacent discs in the stack extending circumferentially across the passageways.

4. The disc of claim 1, in which there are four of said openings and four of said imperforate sections, with each opening and each imperforate section disposed on an eighth section of the disc, and in which outer radial edges of each outlet opening are spaced from but disposed closely adjacent the radially extending boundary between the eighth section of the disc of the opening and the eighth sections of the adjacent imperforate sections whereby the radially extending area of overlap of adjacent discs is small to provide a correspondingly high sealing pressure in the overlap area.